J. J. KELLY.
TIRE FASTENING DEVICE.
APPLICATION FILED NOV. 6, 1911.
1,065,139.
Patented June 17, 1913.
2 SHEETS—SHEET 1.
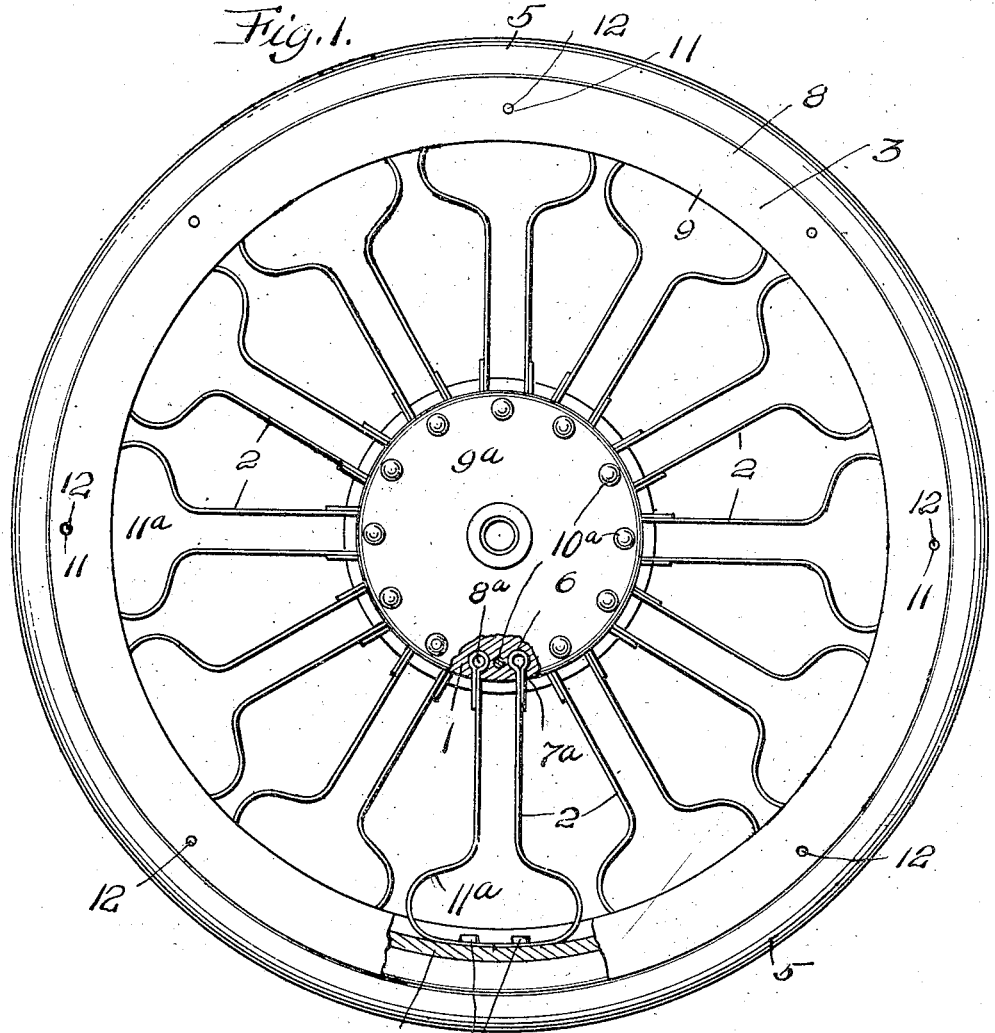
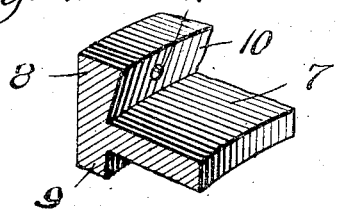
WITNESSES
INVENTOR
J. J. Kelly.
BY
ATTORNEYS

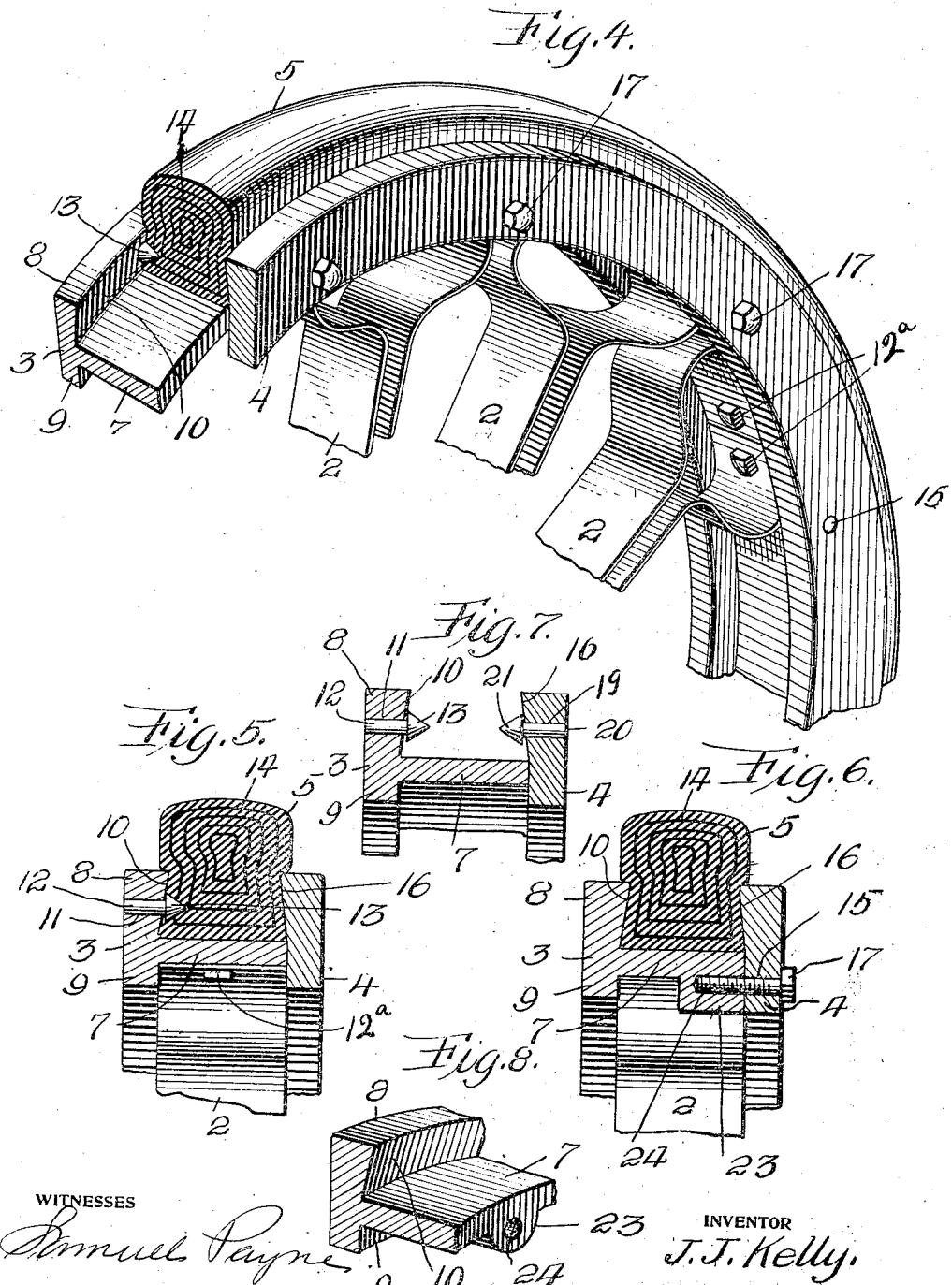

UNITED STATES PATENT OFFICE.

JAMES J. KELLY, OF CRAFTON, PENNSYLVANIA.

TIRE-FASTENING DEVICE.

1,065,139.     Specification of Letters Patent.     Patented June 17, 1913.

Application filed November 6, 1911. Serial No. 658,705.

*To all whom it may concern:*

Be it known that I, JAMES J. KELLY, a citizen of the United States of America, residing at Crafton, in the county of Allegheny and State of Pennsylvania, have invented certain new and useful Improvements in Wheels, of which the following is a specification, reference being had therein to the accompanying drawing.

This invention relates to tire fastening devices for elastic tired wheels and is an improvement upon my prior Patent No. 927,977 granted to me July 13th, 1909.

Besides having the same objects in view as disclosed in my prior patent, the present invention aims to provide wheels of motor or other vehicles with a novel type of rim for holding a yieldable or a solid tire that can be advantageously used in connection with motor trucks, automobiles or other vehicles.

Another object of this invention is the provision of simple and effective means for preventing the displacement of a tire relatively to a rim, yet permitting of the tire being easily and quickly removed when it is desired to renew the same.

A further object of this invention is to furnish a wheel with a metallic rim made of standard material that can be arranged to firmly support a tire upon the periphery of the wheel.

A still further object of this invention is to provide a tire and tire holder consisting of comparatively few parts, inexpensive to manufacture, easy to assemble, and highly efficient for the purposes for which they are intended.

I attain the above objects by a mechanical construction that will be hereinafter specifically described and then claimed, and reference will now be had to the drawings, wherein there are illustrated the preferred embodiments of the invention, but it is to be understood that the structural elements thereof are susceptible to such changes as fall within the scope of the appended claims.

Reference will now be had to the drawings wherein like numerals denote corresponding parts throughout the several views, in which:—

Figure 1 is a side elevation of a wheel, partly broken away and partly in section, showing the adaptation therewith of a tire fastening device in accordance with this invention. Fig. 2 is a perspective view of a portion of the rim of the wheel, Fig. 3 is a perspective view of a detached retaining pin, Fig. 4 is a perspective view of a portion of the wheel, Fig. 5 is a cross sectional view of a portion of the wheel, Fig. 6 is a cross sectional view of another portion of the wheel, Fig. 7 is a cross sectional view of a portion of a modified form of wheel, and Fig. 8 is a perspective view of a portion of a rim section.

A wheel in accordance with this invention comprises a hub 1, resilient and yieldable spokes 2, a sectional rim consisting of sections 3 and 4, and a tire 5.

The hub 1, adjacent to the periphery thereof, is provided with sets of sockets 6 and slots $7^a$ in communication with said sockets. Arranged in the sockets 6 are the inner bent looped ends $8^a$ of the radially disposed spokes 2. The protruding inner ends of the spokes brace said spokes and add rigidity to the same at the periphery of the hub. The inner ends of the spokes are retained within the sockets by a plate $9^a$ bolted or otherwise connected to the hub, as at $10^a$, the bolts being arranged between the sockets 6. The outer ends of the spokes are bent to form oval-shaped head portions $11^a$, the outer ends of said spokes being riveted, bolted or otherwise secured, as at $12^a$ to the web 7 of the rim section 3.

The spokes 2 are disposed in a manner and shaped whereby they will coöperate in supporting the hub 1 normally concentric of the wheel, but cushion said hub in any direction when pressure is brought to bear upon the same by the weight of a vehicle body. All of the spokes coöperate in suspending the hub 1, the uppermost spokes being contracted by a downward pressure upon the hub and the lowermost spokes expanded, the lowermost spokes having the head portions thereof expanded to that degree as to contact and provide practically solid units for supporting the hub 1.

The section 3 of the rim is T-shaped in cross section and the outer flange 8 of said section is of a greater depth than the inner flange 9. The outer flange 8 has that portion of its inner face which projects from the outer face of the web 7 inclined as at 10, the inclination being outwardly and inwardly whereby said inclined face will overhang the web 7, that portion of the flange 8 which projects outwardly from the web 7 is provided with a plurality of equally spaced transverse openings 11. Arranged in these openings are retaining pins 12 that completely fill said openings, and the inner ends of said pins have conical-shaped heads 13 adapted to engage in the inner side walls of a tire 14 arranged circumferentially of the web 7. The tire 14 can be made of solid rubber, laminated rubber, packing, or any resilient material that will cushion the rim of the wheel.

The inner side of the web 7 of the rim section 3 is provided with a plurality of equally spaced transverse enlargements 23 having sockets 24 formed therein with the walls screw threaded.

The section 4 comprises a ring provided with equally spaced openings 15 and the outer edge of the inner wall of said section is beveled or inclined, as at 16 to coöperate with the inner wall 10 of the section 3 in gripping the tire 14. Arranged in the openings 15 are screws 17 that are screwed into the sockets 24 of the enlargements 23. The openings are preferably staggered relatively to the openings 11 in order not to weaken the rim structure.

The section 3 of the rim is made of a single piece of T-bar that has the ends thereof electrically welded or otherwise secured together, and the section 4 is made of a single piece of material with the ends thereof connected together. The manner in which the sections 3 and 4 are made is a manufacturer's detail and for this reason I do not care to confine my invention to the production of the rim sections. The section 4 is at the outer side of the rim, whereby it can be easily detached when it is desired to renew the tire 5. The tire 5 can be quickly placed upon the web 7, driven into engagement with the conical-shaped heads 13, or forced into engagement with the heads when the section 4 is attached to the edge of the web 7.

In some instances, the section 4 can be provided with openings 19 to receive retaining pins 20 having heads 21 similar to the pins 12, the pins 20 are arranged opposite the pins 12, whereby the side walls of the tire will be firmly held by said sections, without injury to the tire. The pins 12 and 20 can be easily dropped into place and said pins prevent accidental displacement of the tire relatively to the rim.

I attach considerable importance to the fact that the rim of the wheel consists of two parts that can be used in connection with rigid spokes and the ordinary type of hub as well as the resilient spokes and specially designed hub of my prior patent. The sections of the rim are inexpensive to manufacture and as heretofore pointed out, packing, such as is used for steam, can be utilized as a tire, the retaining pins preventing accidental displacement of the tire when an automobile or other vehicle is in motion. By using packing as the tire, skidding or sliding is eliminated and when such a tire is used in connection with the resilient spokes, the same degree of resiliency or cushioning is obtained as though pneumatic tires were employed.

What I claim is:—

1. A wheel rim comprising an annular body T-shaped in cross section and including a web terminating in an outwardly projecting flange, said outer flange formed with spaced transverse openings and further having its inner face inclined to overhang the outer face of the web, a ring positioned intermediate of its outer and inner edges against the other side edge of said web and having a portion thereof opposing said flange, means for connecting the ring to the web, said flange, ring and web providing a channel for connecting a resilient tire in position, and pins including shanks and heads, said shanks seated in the openings of said flange and said heads arranged inwardly with respect to said flange and adapted to engage in the tire to prevent circumferential creeping thereof.

2. A wheel rim comprising an annular body provided with a channel for the reception of a tire, one side of the channel being detachably secured in position and the other side being fixed, said fixed side formed with spaced openings, and pins including shanks and heads, said shanks seated in the openings of said fixed side and said heads arranged inwardly with respect to said fixed side and adapted to engage in the tire to prevent circumferential creeping thereof.

In testimony whereof I affix my signature in the presence of two witnesses.

JAMES J. KELLY.

Witnesses:
MAX H. SROLOVITZ,
CHRISTINA F. HOOD.